United States Patent
Cantwell et al.

(10) Patent No.: US 12,158,735 B2
(45) Date of Patent: *Dec. 3, 2024

(54) PROCESS RECIPE CREATION AND MATCHING USING FEATURE MODELS

(71) Applicant: Applied Materials, Inc., Santa Clara, CA (US)

(72) Inventors: Dermot P. Cantwell, Sunnyvale, CA (US); Taehun Kim, East Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,879

(22) Filed: Sep. 8, 2023

(65) Prior Publication Data
US 2023/0418245 A1    Dec. 28, 2023

Related U.S. Application Data

(63) Continuation of application No. 17/473,013, filed on Sep. 13, 2021, now Pat. No. 11,860,591.

(51) Int. Cl.
G05B 13/04    (2006.01)
G05B 13/02    (2006.01)

(52) U.S. Cl.
CPC ....... *G05B 13/042* (2013.01); *G05B 13/0265* (2013.01); *G05B 13/048* (2013.01)

(58) Field of Classification Search
None
See application file for complete search history.

(56) References Cited

U.S. PATENT DOCUMENTS

| | | |
|---|---|---|
| 6,615,098 B1 | 9/2003 | Bode |
| 2004/0049297 A1 | 3/2004 | Card |
| 2006/0015206 A1* | 1/2006 | Funk ................ H01L 21/67253 |
| | | 700/121 |

(Continued)

FOREIGN PATENT DOCUMENTS

| | | | |
|---|---|---|---|
| JP | 2010067812 A | * | 3/2010 |
| KR | 101186694 B1 | | 9/2012 |

OTHER PUBLICATIONS

Applied Materials, "Applied Smartfactory Run-to-Run Control" https://www.appliedmaterials.com/automation-software/e3-run-to-run-control-r2r, 2021, 3 pages.

(Continued)

*Primary Examiner* — David Earl Ogg
(74) *Attorney, Agent, or Firm* — Lowenstein Sandler LLP

(57) ABSTRACT

A method includes determining, by a processing device, whether a first process recipe including a set of Pareto efficient parameters is to be selected from a set of process recipes, wherein the set of Pareto efficient parameters fail to satisfy each target property of a set of target properties for processing the component, in response to determining that a first process recipe is not to be selected from a set of process recipes for processing the component, selecting, by the processing device from the set of process recipes, a second process recipe including a set of parameters satisfying each target property of the set of target properties, and causing, by the processing device, the component to be processed by a process tool using the second process recipe.

20 Claims, 8 Drawing Sheets

(56) References Cited

U.S. PATENT DOCUMENTS

| | | | |
|---|---|---|---|
| 2007/0078553 A1* | 4/2007 | Miwa | G06F 30/00 |
| | | | 700/97 |
| 2013/0204418 A1* | 8/2013 | Chang | G05B 19/41875 |
| | | | 700/110 |
| 2015/0227139 A1* | 8/2015 | Yamamoto | G06N 5/022 |
| | | | 700/110 |
| 2020/0110390 A1 | 4/2020 | Banna | |
| 2020/0349487 A1 | 11/2020 | Stacey | |
| 2021/0159059 A1 | 5/2021 | Higuchi | |
| 2022/0171290 A1* | 6/2022 | Onose | G03F 7/706841 |
| 2022/0210525 A1* | 6/2022 | Adan | G03F 7/705 |

OTHER PUBLICATIONS

Applied Materials, "Applied SmartFactory Run-to-Run Solution Brief", https://www.appliedmaterials.com/files/SmartFactory-Run-to-Run-Solution-Brief.pdf, 2019, 2 pages.

PCT Notification of Transmittal of the International Search Report and the Written Opinion of the International Searching Authority for PCT Application No. PCT/US2022/043123, mailed Jan. 4, 2023, 11 pages.

\* cited by examiner

PROCESS RECIPE CREATION AND MATCHING USING FEATURE MODELS

CROSS-REFERENCE TO RELATED APPLICATION(S)

The present application is a continuation of U.S. patent application Ser. No. 17/473,013, filed on Sep. 13, 2021, the entire contents of which are hereby incorporated by reference herein.

TECHNICAL FIELD

Embodiments of the present disclosure relate, in general, to manufacturing systems and more particularly to process recipe creation and matching using feature models.

BACKGROUND

Semiconductor wafer processing complexity has been increasing as the device size has been shrinking. A typical wafer processing method has multiple different processes, with some advanced methods (e.g., plasma etching) having twenty or even more processes. Each process has a multitude of process control variables, also referred to as "knobs," that can be used to tune and optimize performance. Therefore, the space available to tune and optimize a given process is theoretically extremely large.

Process engineers use their experience and expertise to select a preliminary baseline process and fine-tune the process based on a limited number of wafers (or portions of wafers, referred to as coupons) dedicated for design of experiment (DoE). The goal of DoE is to tailor the process to achieve desired specification on a wafer. However, dedicating full wafers or portions of wafers for DoE data collection consume valuable resources. Therefore, often the adopted process may be a viable one, but not necessarily the optimum solution.

Another bottleneck is introduced by insufficient in-line precision metrology data. For precision metrology, usually destructive techniques, such as transmission electron microscopy (TEM), are used. However, since TEM is very time consuming, it generally does not generate enough statistical data and adequate coverage across the wafer. Also, it may not be possible to integrate TEM into the production line because it is a destructive technique.

SUMMARY

In some embodiments, a method is provided. The method includes receiving, by a processing device, a set of feature models, each feature model of the set of feature models corresponding to a respective feature associated with processing of a component, receiving, by the processing device a set of target properties for processing the component, wherein the set of target properties includes, for each feature, a respective target, determining, by the processing device based on the set of feature models, one or more sets of predicted processing parameters in view of the set of target properties, generating, by the processing device, one or more candidate process recipes each corresponding to a respective one of the one or more sets of predicted processing parameters, wherein the one or more candidate process recipes each correspond to a set of predicted properties including, for each feature, a respective predicted property value resulting from component processing, and selecting, by the processing device from the one or more candidate process recipes, a process recipe for processing the component.

In some embodiments, a system including a memory and a processing device coupled to the memory is provided. The processing device is to perform operations including receiving a set of feature models, each feature model of the set of feature models corresponding to a respective feature associated with processing of a component, receiving a set of target properties for processing the component, wherein the set of target properties includes, for each feature, a respective target, determining, based on the set of feature models, one or more sets of predicted processing parameters in view of the set of target properties, generating one or more candidate process recipes each corresponding to a respective one of the one or more sets of predicted processing parameters, wherein the one or more candidate process recipes each correspond to a set of predicted properties including, for each feature, a respective predicted property value resulting from component processing, and selecting, from the one or more candidate process recipes, a process recipe for processing the component.

In some embodiments, a non-transitory computer readable storage medium is provided. The non-transitory computer readable storage medium includes instructions that, when executed by a processing device, cause the processing device to perform operations including receiving a set of feature models, each feature model of the set of feature models corresponding to a respective feature associated with processing of a component, receiving a set of target properties for processing the component, wherein the set of target properties includes, for each feature, a respective target, determining, based on the set of feature models, one or more sets of predicted processing parameters in view of the set of target properties, generating one or more candidate process recipes each corresponding to a respective one of the one or more sets of predicted processing parameters, wherein the one or more candidate process recipes each correspond to a set of predicted properties including, for each feature, a respective predicted property value resulting from component processing, and selecting, from the one or more candidate process recipes, a process recipe for processing the component.

In some embodiments, a method is provided. The method includes determining, by a processing device, whether a first process recipe including a set of Pareto efficient parameters is to be selected from a set of process recipes, wherein the set of Pareto efficient parameters fail to satisfy each target property of a set of target properties for processing the component, in response to determining that a first process recipe is not to be selected from a set of process recipes for processing the component, selecting, by the processing device from the set of process recipes, a second process recipe including a set of parameters satisfying each target property of the set of target properties, and causing, by the processing device, the component to be processed by a process tool using the second process recipe.

In some embodiments, a system including a memory and a processing device coupled to the memory is provided. The processing device is to perform operations including determining whether a first process recipe including a set of Pareto efficient parameters is to be selected from a set of process recipes, wherein the set of Pareto efficient parameters fail to satisfy each target property of a set of target properties for processing the component, in response to determining that a first process recipe is not to be selected from a set of process recipes for processing the component, selecting, from the set of process recipes, a second process recipe including a set of parameters satisfying each target property of the set of target properties, and causing the component to be processed by a process tool using the second process recipe.

In some embodiments, a non-transitory computer readable storage medium is provided. The non-transitory computer readable storage medium includes instructions that, when executed by a processing device, cause the processing device to perform operations including determining whether a first process recipe including a set of Pareto efficient parameters is to be selected from a set of process recipes, wherein the set of Pareto efficient parameters fail to satisfy each target property of a set of target properties for processing the component, in response to determining that a first process recipe is not to be selected from a set of process recipes for processing the component, selecting, from the set of process recipes, a second process recipe including a set of parameters satisfying each target property of the set of target properties, and causing the component to be processed by a process tool using the second process recipe.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
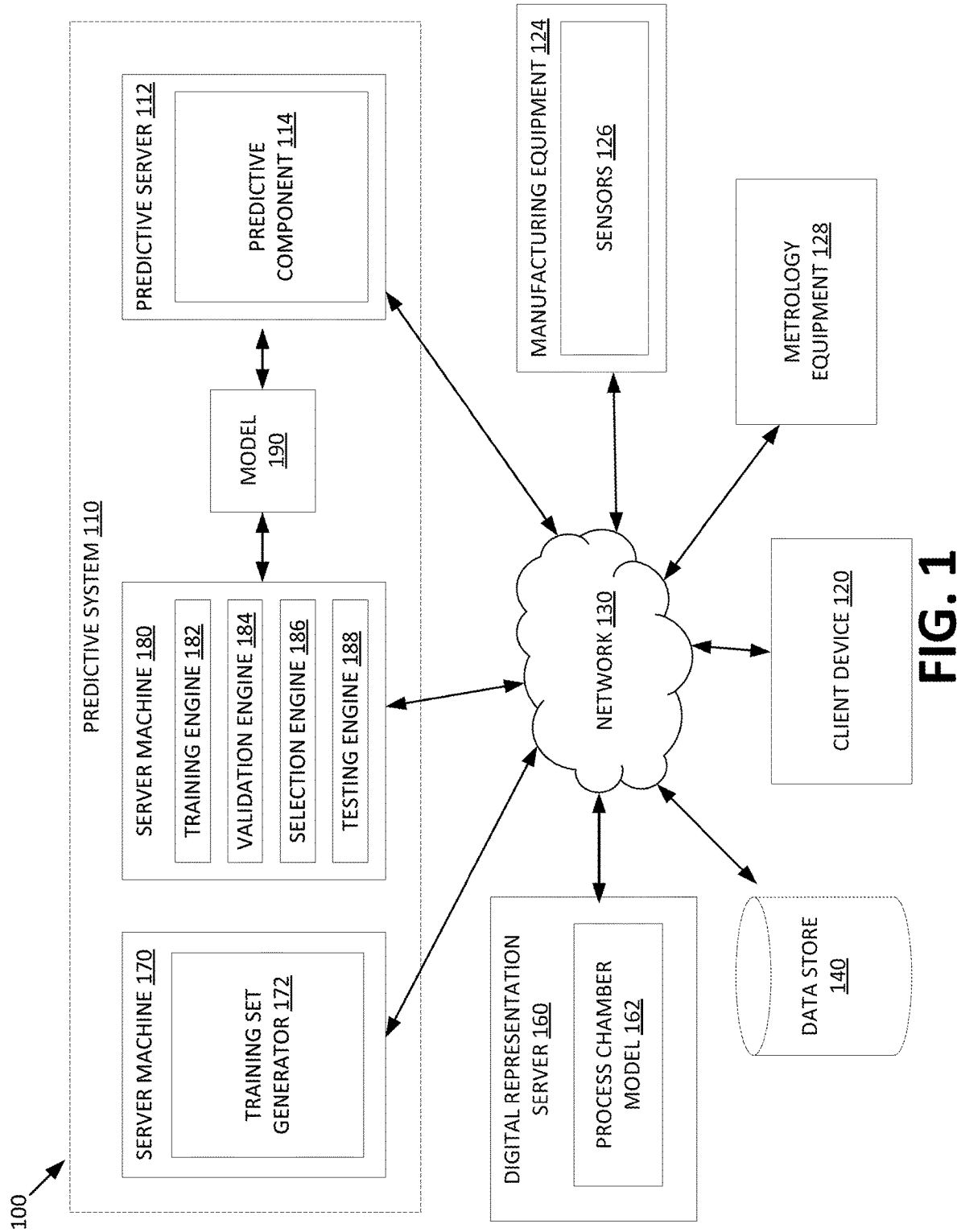
FIG. 1 depicts an illustrative computer system architecture, according to aspects of the present disclosure.

Implementations described herein provide for process recipe ("recipe") creation and matching using machine learning feature models. Manufacturing processes may be disrupted due to a variety of factors such as wear and tear on equipment, process drifts, inconsistent operation, maintenance events and product changes. Process disruptions can result in lots that are out-of-specification or off target. For example, to address pad wear in a chemical mechanical polish process that results in wafer thickness variances, process engineers can make recipe adjustments to ensure proper process targeting. Other variances due to tool age, if not corrected, may also lead to scrapped wafers.

Advanced process control (APC) tools, such as Run-to-Run (R2R) controllers, can be used to monitor and reduce process variances. An R2R controller, such as the Applied SmartFactory® Run-to-Run Solution provided by Applied Materials®, can improve process capability (Cpk) and optimize recipe parameters from batch-to-batch (B2B), lot-to-lot (L2L) and/or wafer-to-wafer (W2W) based on knowledge of material context, feedback from process models, incoming variations, metrology data, etc. R2R controllers can be used to improve processes performed during front-end semiconductor wafer manufacturing, semiconductor assembly and testing, display manufacturing, etc. With R2R, manufacturers can make automatic adjustments to processes to maintain a required target value for specific properties, such as wafer thickness and critical dimension. Manufacturers can also use metrology data from each process operation to adjust process recipes on an R2R basis and define customized strategies, such as rework, to be performed in an automated fashion. The solution is designed to support high-mix and low-volume manufacturing operations, which have always posed a challenge in the industry.

Conventionally, a recipe for a processing method can be embodied as a table of recipe settings including a set of inputs or recipe parameters ("parameters") and processes that are manually entered by a user (e.g., process engineer) to achieve a set of target properties (e.g., on-wafer characteristics), also referred to as a set of goals. For example, the inputs can correspond to rows of the table and the processes can corresponds to the columns of the table. However, such manual population of parameters and/or processes can lead to recipes that are not optimized in view of multiple desired characteristics. For example, complex interrelationships may exist between desired characteristics, in which modifying the parameters and/or processes of the recipe to achieve a desired characteristic can have potentially unintended consequences on one or more other desired characteristics. Accordingly, by not taking all of these complex interrelationships into account, a sub-optimal recipe can be created.

Aspects of the present disclosure address the above noted and other deficiencies by providing for recipe creation and matching using feature models (e.g., machine learning feature models). The recipe creation and matching described herein can be performed using a set of feature models. A feature model can be a type of supervised regression model. One example of a feature model is a multiple-input-single-output (MISO) feature model of the form $Y = f(\vec{X})$, where the input $\vec{X}$ includes multiple parameters organized as a vector and the output Y is a single scalar output. Another example of a feature model is a multiple-input-multiple-output (MIMO) feature model of the form $Y = f(\vec{X})$, where the input $\vec{X}$ includes multiple parameters organized as a vector and the output Y includes multiple outputs organized as a vector. One type of MIMO feature model is a spatial-output MIMO that further defines spatial coordinates for each output. Feature models can be implemented using any suitable regression algorithm. Examples of regression algorithms include linear regression, Gaussian process regression, partial least squares, gradient boosted trees, random forest, fully connected neural networks, etc.

In the context of recipe creation described herein, the set of feature models can include a number of individual feature models each corresponding to a desired feature (e.g., on-wafer feature). For example, each feature model can be a spatial MIMO model in which the input vector includes input recipe parameters, the output vector includes output measurements of features at different locations on the wafer, and the spatial location (e.g., X-Y coordinate) for each output measurement can be included. Illustratively, a user can input a desired requirement for each feature. Using numerical optimization routines based on the feature models, the continuous process space can be searched to obtain a set of optimal recipes in view of the desired requirements. Moreover, the recipe can be used by a matching technique to generate a set of offsets to correct for mismatch between the expected or desired process behavior indicated by the recipe and a current or predicted behavior.

Advantages of the present disclosure include, but are not limited to, increased speed-to-value, quicker deployment time, minimized risk during development, robustness to incoming noise to improve recipe stability, improved process capability, minimized scrapped wafers and send-ahead wafers, and reduction or elimination of manual tuning. Accordingly, aspects of the present disclosure can improve device yield and reduce costs.

FIG. 1 depicts an illustrative computer system architecture 100, according to aspects of the present disclosure. Computer system architecture 100 can include a client device 120, a predictive server 112 (e.g., to generate predictive data, to provide model adaptation, to use a knowledge base, etc.), and a data store 140. The predictive server 112 can be part of a predictive system 110. The predictive system 110 can further include server machines 170 and 180. In some embodiments, computer system architecture 100 can be included as part of a manufacturing system for processing substrates or wafers. In such embodiments, computer system architecture 100 can include manufacturing equipment 124, metrology equipment 128 and/or testing equipment (not shown).

Manufacturing equipment 124 can produce products, such as electronic devices, following a recipe or performing runs over a period of time. Manufacturing equipment 124 can include a process chamber, such as tool/chamber 220 described with respect to FIG. 2. Manufacturing equipment 124 can perform a process for a wafer (e.g., a substrate, semiconductor, etc.) at the process chamber. Examples of wafer processes include a deposition process to deposit a film on a surface of the wafer, an etch process to form a pattern on the surface of the wafer, a wafer heating process to heat a wafer to a target temperature prior to a deposition process or an etch process, a wafer cooling process to cool a wafer to a target temperature following a deposition process and/or an etch process, etc. Manufacturing equipment 124 can perform each process according to a process recipe. A process recipe defines a particular set of operations to be performed for the wafer during the process and can include one or more settings associated with each operation. For example, a wafer heating process can include a positional setting for the wafer disposed within the process chamber, a temperature setting for the process chamber, a pressure setting for the process chamber, a pressure setting for the process chamber, etc.

In some embodiments, manufacturing equipment 124 can include one or more sensors 126 configured to generate process sensor data for an environment within or outside of a process chamber and/or a wafer disposed within the process chamber. Sensor data can include a value of one or more of temperatures (e.g., heater temperature), spacing (SP), pressure, high frequency radio frequency (HFRF), voltage of electrostatic chuck (ESC), electrical current, flow, power, voltage, etc. Sensor data can be associated with or indicative of manufacturing parameters such as hardware parameters, such as settings or components (e.g., size, type, etc.) of the manufacturing equipment 124, or process parameters of the manufacturing equipment 124. The sensor data can be provided while the manufacturing equipment 124 is performing manufacturing processes (e.g., equipment readings when processing products). The sensor data can be different for each wafer processed at manufacturing equipment 124.

Metrology equipment 128 can provide metrology data associated with wafers (e.g., wafers, etc.) processed by manufacturing equipment 124. In some embodiments, metrology data can include data generated for a film on a surface of a wafer before, during, or after a deposition and/or an etch process is performed for that wafer. For example, metrology data can include a value of film property data (e.g., wafer spatial film properties), dimensions (e.g., thickness, height, etc.), dielectric constant, dopant concentration, density, defects, etc. generated for a wafer after completion of a wafer process. In some embodiments, the metrology data can further include data associated with a portion of a wafer that is not subject to a deposition and/or an etch process. For example, a film can be deposited on a top surface of a wafer prior to an etch process that is to etch away a portion of the film and create a target wafer surface pattern. A wafer heating process can initiated for the wafer to heat the wafer to a target temperature prior to initiate of the etch process.

The client device 120 can include a computing device such as personal computers (PCs), laptops, mobile phones, smart phones, tablet computers, netbook computers, network connected televisions ("smart TVs"), network-connected media players (e.g., Blu-ray player), a set-top box, over-the-top (OTT) streaming devices, operator boxes, etc. In some embodiments, computer system architecture 100 can receive data associated with a process recipe for a process to be performed for a wafer at manufacturing equipment 124 from client device 120. For example, client device 120 can display a graphical user interface (GUI), where the GUI enables a user (e.g., an engineer, an operator, a developer, etc.) to provide, as input, data associated with one or more process recipe settings for a wafer heating process and/or a wafer cooling process to be performed for a wafer at a process chamber of manufacturing equipment 124.

Data store 140 can be a memory (e.g., random access memory), a drive (e.g., a hard drive, a flash drive), a database system, or another type of component or device capable of storing data. Data store 140 can include multiple storage components (e.g., multiple drives or multiple databases) that can span multiple computing devices (e.g., multiple server computers). In some embodiments, data store 140 can store sensor data, metrology data, predictive data, and/or contextual data. Sensor data can include historical sensor data (e.g., sensor data generated by sensors 126 for a previous wafer processed at manufacturing equipment 124) and/or current sensor data (e.g., sensor data generated by sensors 126 for a current wafer being processed at manufacturing equipment 124). In some embodiments, current sensor data can be data for which predictive data is generated. Sensor data can include but is not limited to, data indicating a temperature of one or more components of manufacturing equipment 124 (e.g., a temperature of a lid and/or a window of a process chamber, a temperature of a heating element embedded within a wafer support assembly of the process chamber, etc.), data indicating a temperature of a wafer during a wafer process, data indicating a pressure at one or more portions of an environment within manufacturing equipment 124 (e.g., a pressure of the environment between a lid and/or window of a process chamber and a surface of a wafer, a pressure of the environment between a surface of a wafer and a surface of a wafer support assembly, etc.), data indicating a concentration or flow rate of one or more gases flowed into manufacturing equipment 124 before, during and/or after a wafer process, and so forth. Data store can store metrology data, in some embodiments. Metrology data can include historical metrology data (e.g., metrology data generated by metrology equipment 128 for a previous wafer processed at manufacturing equipment 124).

Contextual data refers to data associated with a wafer and/or a wafer process performed at manufacturing equipment 124. In some embodiments, contextual data can include data associated with the wafer (e.g., such as an identifier for a wafer, a type of the wafer, etc.). Contextual data can additionally or alternatively include data associated with one or more components of manufacturing equipment 124 used to process the wafer. For example, contextual data can include an identifier for the one or more components of manufacturing equipment 124, one or more physical properties associated with the one or more components (e.g. an emissivity of the one or more components, a molecular weight of the one or more components, etc.), an identifier associated with an operator of manufacturing equipment 124, a type of the process performed at manufacturing equipment 124, etc.

In additional or alternative embodiments, contextual data can include data associated with a process recipe performed for the wafer at manufacturing equipment 124. For example, contextual data can include an identifier of a name for the process recipe, an operation number for an operation of the process recipe, or settings for one or more operations of the process recipe (referred to herein as a process recipe setting). A process recipe setting can include a positional setting for the wafer or one or more components of manufacturing equipment 124, such as a setting for a position of a wafer disposed within a process chamber relative to a lid and/or a window of the process chamber, a position of the wafer relative to a wafer support assembly of the process chamber, a position of the wafer support assembly relative to the lid and/or the window of the process chamber, a velocity of a movement of the wafer support assembly (with or without a wafer) toward or away from the lid and/or the window of the process chamber, a velocity of a movement of the wafer toward or away from a surface of the wafer support assembly, etc. A process recipe setting can also include a temperature and/or pressure setting for one or more components of manufacturing equipment 124 and/or the wafer disposed within manufacturing equipment 124. A process recipe setting can also include a gas flow setting for the wafer process, including a setting indicating a target composition and/or concentration of a gas flowed into a process chamber of manufacturing equipment 124, a flow rate of the gas flowed into the process chamber, a temperature of the gas flowed into the process chamber, etc.

Contextual data can include historical contextual data (e.g., contextual data for a prior wafer process performed for a prior wafer at manufacturing equipment 124) and/or current contextual data (e.g., contextual data for a wafer process currently performed or to be performed for a current wafer at manufacturing equipment 124). Current contextual data can be data for which predictive data is generated, in accordance with embodiments described herein. Historical contextual data and/or current contextual data can be provided to system 100 via a GUI of client device 120, in accordance with previously described embodiments.

In some embodiments, data store 140 can be configured to store data that is not accessible to a user of the manufacturing system. For example, testing data, contextual data, etc. for a wafer support assembly is not accessible to a user (e.g., an operator) of the manufacturing system and/or testing system. In some embodiments, all data stored at data store 140 can be inaccessible by the user of the system. In other or similar embodiments, a portion of data stored at data store 140 can be inaccessible by the user while another portion of data stored at data store 140 can be accessible by the user. In some embodiments, one or more portions of data stored at data store 140 can be encrypted using an encryption mechanism that is unknown to the user (e.g., data is encrypted using a private encryption key). In other or similar embodiments, data store 140 can include multiple data stores where data that is inaccessible to the user is stored in one or more first data stores and data that is accessible to the user is stored in one or more second data stores.

In some embodiments, predictive system 110 can include a server machine 170 and/or a server machine 180. Server machine 170 includes a training set generator 172 that is capable of generating training data sets (e.g., a set of data inputs and a set of target outputs) to train, validate, and/or test a machine learning model 190 (e.g., feature model). For example, training set generator 172 can generate training sets to train, validate, and/or test the machine learning model 190 to predict process recipe settings for a process to be performed for a wafer at manufacturing equipment 124, in accordance with embodiments provided herein.

In some embodiments, training set generator 172 can generate training sets for machine learning model 190 based on historical sensor, metrology, and/or contextual data associated with one or more prior wafer processes performed at manufacturing equipment 124. In additional or alternative embodiments, training set generator 172 can generate training sets for machine learning model 190 based on predictive or simulated sensor, metrology, and/or contextual data generated by a digital replica model (e.g., digital twin) of manufacturing equipment 124. A digital replica model (also referred to as a digital replica herein) can be an algorithmic model that simulates manufacturing equipment 124, in some embodiments.

In some embodiments, digital representation server 160 can be a digital replica of manufacturing equipment 124. Digital representation server 160 can use supervised machine learning, semi-supervised learning, unsupervised machine learning, or any combination thereof to generate a virtual representation of the physical elements and/or the dynamics of how manufacturing equipment 124 operate. Digital representation server 160 can be updated via reinforcement learning using periodic updates from sensors 126 and/or data associated with generating and maintaining the digital replica data of manufacturing equipment 124, such as sensor data, performance data (e.g., data associated with an efficiency, latency, throughput, etc. of one or more components of manufacturing equipment 124), library data, etc. In some embodiments, digital representation server 160 can include a processing chamber model 162 that is associated with the physical elements and dynamics of a process chamber of manufacturing equipment 124.

Digital representation server 160 can generate simulation data that is used to determine how manufacturing equipment 124 would perform based on current or simulated parameters. The simulation data can be stored at data store 140, in some embodiments. In some embodiments, the simulation data can include one or more process recipe settings associated with a wafer process (e.g., a wafer temperature control process) for a wafer at a process chamber. The simulation data can also include predicted property data and/or predicted metrology data (e.g., virtual metrology data) of the digital replica of manufacturing equipment 124 (e.g., of products to be produced or that have been produced using current sensor data at data store 140). The simulation data can also include an indication of abnormalities (e.g., abnormal products, abnormal components, abnormal manufacturing equipment 124, abnormal energy usage, etc. and one or more causes of the abnormalities. The simulation data can further include an indication of an end of life of a component of manufacturing equipment 124. The simulation data can be all encompassing, covering every mechanical and/or electrical aspect of manufacturing equipment 124.

As described above, training set generator 172 can generate training data for model 190 based on predictive or simulated data obtained from digital representation server 160. For example, training set generator 172 can generate one or more sets of process recipe settings and provide the sets of process recipe settings to digital representation server 160 to simulate a process at a process chamber of manufacturing equipment 124 using process chamber model 162. In some embodiments, the data output by process chamber model 162 can include a pressure differential between a first space of the process chamber environment and a second space of the process chamber environment. The first space of the process chamber environment can include a space between a top surface of the wafer and a ceiling (e.g., a lid, a window, etc.) of the process chamber. The second space of the process chamber environment can include a space between a bottom surface of the wafer and a top surface of a wafer support assembly that supports the wafer during the simulated wafer process. In additional or alternative embodiments, the data output by process chamber model 162 can include data associated with a rate of change of a temperature of the wafer between an initial period of the wafer process and a final period of the wafer process (referred to as a ramping rate). In some embodiments, the training set generator 172 can partition the training data (e.g., data for a physical process and/or simulated data) into a training set, a validating set, and a testing set. In some embodiments, the predictive system 110 generates multiple sets of training data.

Server machine 180 can include a training engine 182, a validation engine 184, a selection engine 186, and/or a testing engine 188. An engine can refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 can be capable of training a machine learning model 190. The machine learning model 190 can refer to the model artifact that is created by the training engine 182 using the training data that includes training inputs and corresponding target outputs (correct answers for respective training inputs). The training engine 182 can find patterns in the training data that map the training input to the target output (the answer to be predicted), and provide the machine learning model 190 that captures these patterns. The machine learning model 190 can use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc.

The validation engine 184 can be capable of validating a trained machine learning model 190 using a corresponding set of features of a validation set from training set generator 172. The validation engine 184 can determine an accuracy of each of the trained machine learning models 190 based on the corresponding sets of features of the validation set. The validation engine 184 can discard a trained machine learning model 190 that has an accuracy that does not meet a threshold accuracy. In some embodiments, the selection engine 186 can be capable of selecting a trained machine learning model 190 that has an accuracy that meets a threshold accuracy. In some embodiments, the selection engine 186 can be capable of selecting the trained machine learning model 190 that has the highest accuracy of the trained machine learning models 190.

The testing engine 188 can be capable of testing a trained machine learning model 190 using a corresponding set of features of a testing set from training set generator 172. For example, a first trained machine learning model 190 that was trained using a first set of features of the training set can be tested using the first set of features of the testing set. The testing engine 188 can determine a trained machine learning model 190 that has the highest accuracy of all of the trained machine learning models based on the testing sets.

Predictive server 112 includes a predictive component 114 that is capable of providing one or more process recipe settings that correspond to a spatial profile for a current wafer to be processed at manufacturing equipment 124. As described in detail below, in some embodiments, predictive component 114 is capable of providing data associated with a process recipe for a process to be performed for a wafer as an input to model 190 and obtain one or more outputs of model 190. In some embodiments, the data associated with the process recipe can include an indication of one or more operations to be performed for the process recipe and a target temperature for the wafer at a final period of the wafer process. The process recipe data can include, in some embodiments, one or more target wafer process settings to be applied during the wafer process. Predictive server 112 can provide a set of process recipe settings that correspond to the one or more operations and/or the target temperature for the wafer based on the one or more outputs of model 190. In response to determining that the set of process recipe settings satisfies a level of confidence criterion, predictive server 112 can cause the wafer process to be performed for the wafer at the process chamber in accordance with the determined process recipe settings.

In some embodiments, predictive server 112 can transmit an indication of the one or more process recipe settings to client device 120 as a suggested modification to the one or more target wafer process recipe settings. Client device 120 can display the suggest modifications to the target wafer process recipe settings via a GUI of client device 120. A user (e.g., an operator, an engineer, a developer, etc.) of system 100 can interact with one or more elements of the GUI of client device 120 to cause the wafer process to be initiated or not to be initiated for the wafer in accordance with the one or more process recipe settings obtained from an output of model 190.

The client device 120, manufacturing equipment 124, data store 140, digital representation server 160, predictive server 112, server machine 170, and server machine 180 can be coupled to each other via a network 130. In some embodiments, network 130 is a public network that provides client device 120 with access to predictive server 112, data store 140, and other publically available computing devices. In some embodiments, network 130 is a private network that provides client device 120 access to manufacturing equipment 124, data store 140, digital representation server 160, predictive server 112, and other privately available computing devices. Network 130 can include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

It should be noted that in some other implementations, the functions of digital representation server 160, server machines 170 and 180, as well as predictive server 112, can be provided by a fewer number of machines. For example, in some embodiments, digital representation server 160, server machine 170 and/or server machine 180 can be integrated into a single machine, while in some other or similar embodiments, digital representation server 160, server machine 170 and/or server machine 180, as well as predictive server 112, can be integrated into a single machine.

In general, functions described in one implementation as being performed by digital representation server 160, server machine 170, server machine 180, and/or predictive server 112 can also be performed on client device 120. In addition, the functionality attributed to a particular component can be performed by different or multiple components operating together.

In embodiments, a "user" can be represented as a single individual. However, other embodiments of the disclosure encompass a "user" being an entity controlled by a plurality of users and/or an automated source. For example, a set of individual users federated as a group of administrators can be considered a "user."

Figure 2:
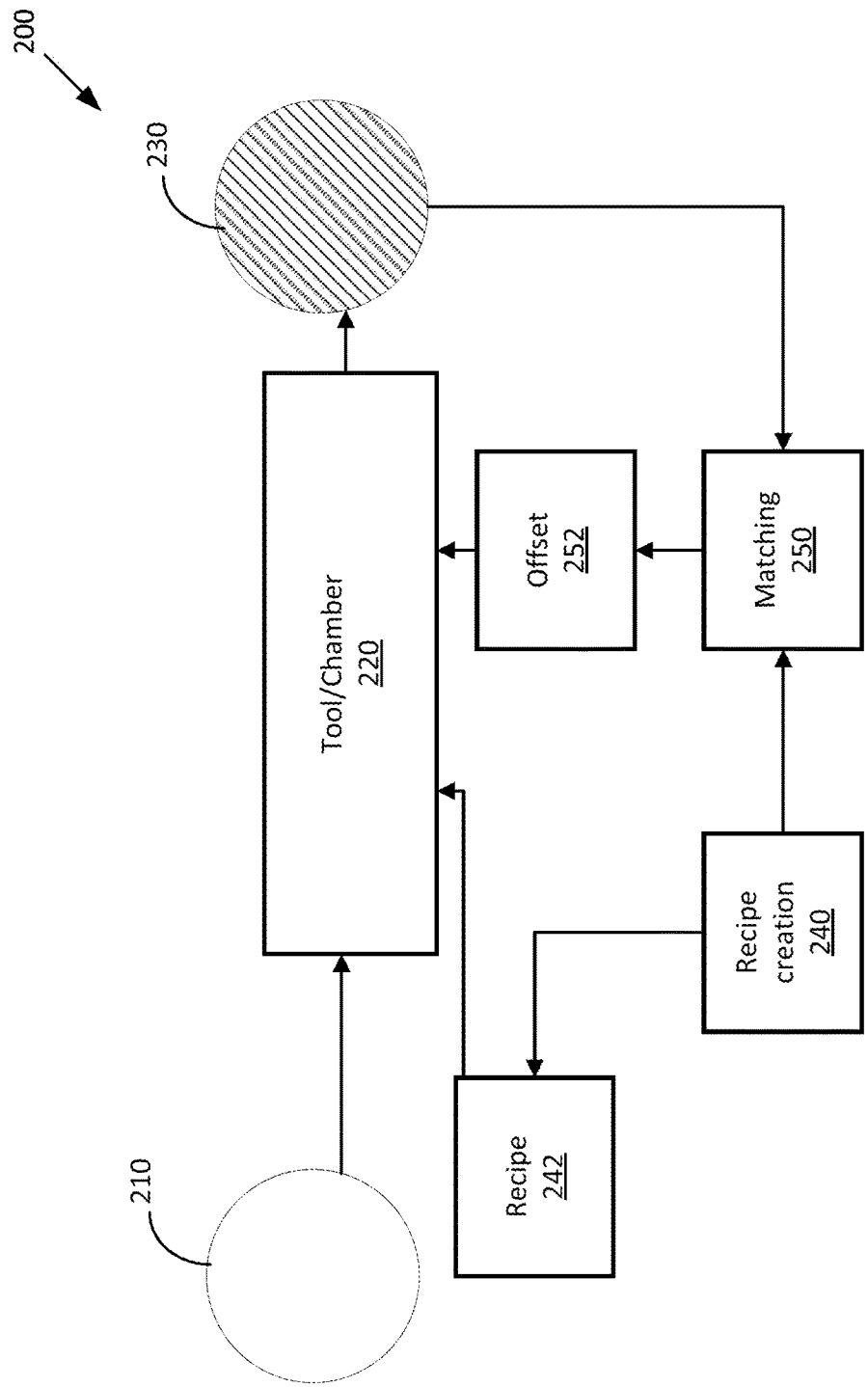
FIG. 2 is a block diagram of a system for implementing process recipe creation and matching using feature models, according to aspects of the present disclosure.

FIG. 2 is a diagram of a system 200 for implementing process recipe creation and matching using features models (e.g., machine learning feature models), according to aspects of the present disclosure. As shown, the system 200 includes an unprocessed substrate or wafer 210 that is received by a tool/chamber 220 to produce a processed wafer 230. More specifically, the tool/chamber 220 can utilize a set of process recipes ("recipes") to produce the processed wafer 230 from the unprocessed wafer 210. Although a wafer is shown, any suitable component can be processed in accordance with the embodiments described herein.

The system 200 includes a recipe creation component 240. The recipe creation component 240 models expected process behavior for a set of recipe parameters in view of a set of desired on-wafer characteristics, also referred to as a set of goals or target properties, and generates a recipe 242 having recipe settings based on the set of goals. The recipe creation component 240 can model the expected process behavior by creating feature models (e.g., machine learning model 190 of FIG. 1). The recipe settings can include a set of recipe parameters and a set of processes. For example, the recipe settings can include one or more relevant recipe parameters for achieving the set of goals. The recipe 242 can be implemented by the tool/chamber 220 to execute the processing of the wafer 210 in view of the recipe 242. Accordingly, goals can be translated into the recipe 242 for processing the unprocessed wafer 210 using the tool/chamber 220 to obtain a processed wafer 230. Further details regarding the recipe creation component 240 will now be described below with reference to FIG. 3.

Figure 3:
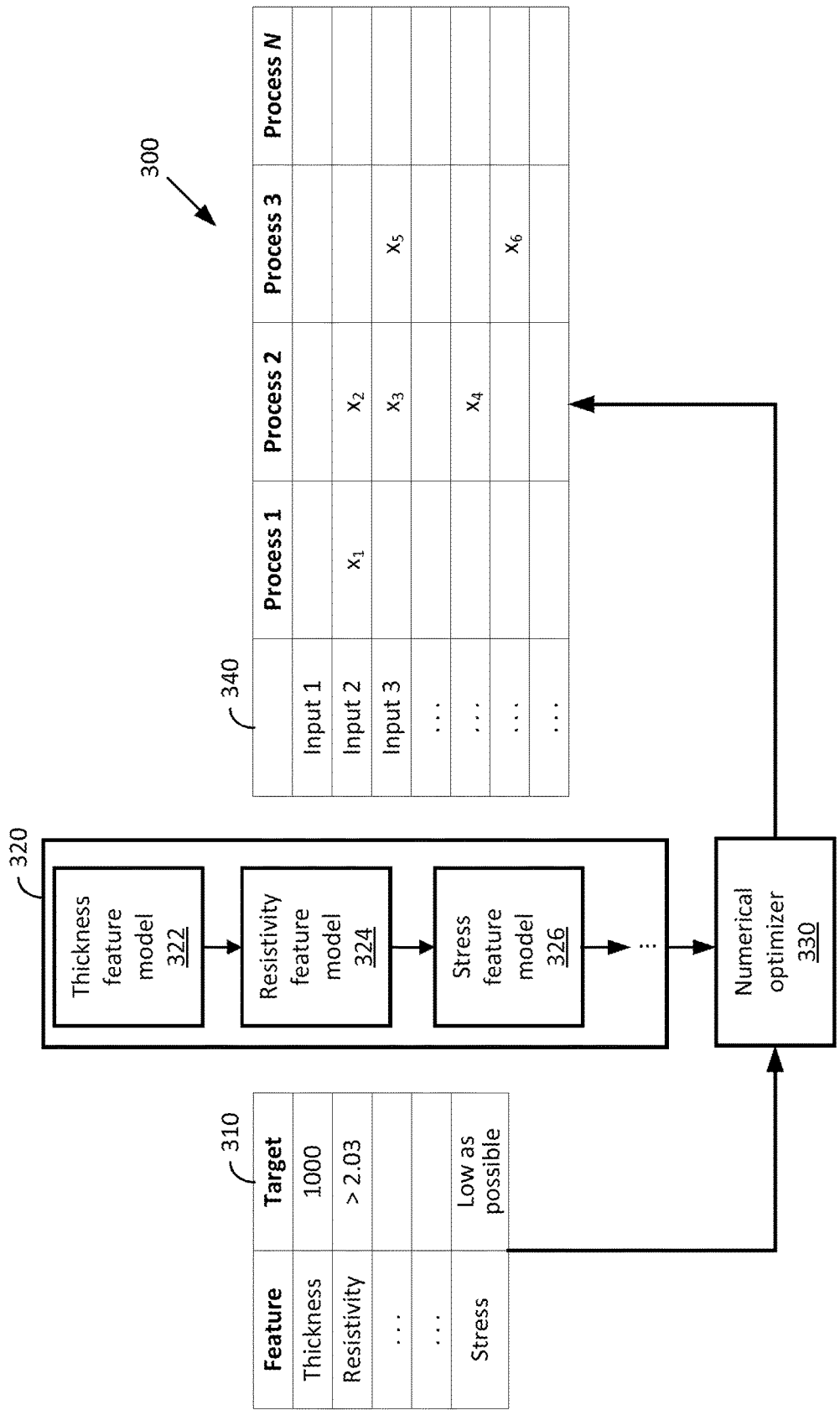
FIG. 3 is a block diagram of system for implementing process recipe creation, according to aspects of the present disclosure.

FIG. 3 is a diagram of a system 300 for implementing process recipe creation, according to aspects of the present disclosure. As shown, a set of target properties 310 and a set of feature models 320 are received by a numerical optimizer component 330. The set of target properties 310 can be received as input from a user. The set of target properties 310 can include multiple features and respective targets for each feature, where each target corresponds to an expected or desired value or range of values for its corresponding feature. Examples of targets include "mean," "less than," "greater than," "low as possible," "profile goal," etc. A profile goal allows a user to specify a profile across the wafer. In this illustrative example, the set of target properties 310 specifies a thickness feature having a corresponding target of "mean" and expected or desired value of 1000 Angstroms (Å) (i.e., the goal for thickness is a mean thickness of 1000 Å), a resistivity feature having a corresponding target of "greater than" and a value of 2.03 Ohm-meters (i.e., the goal for resistivity is a resistivity greater than 2.03 Ohm-meters), and a stress feature having a corresponding target of "low as possible" (i.e., as close to zero as possible).

The set of feature models 320 is shown including a number of feature models. In some implementations, the set of feature models 320 includes a set of regression models. For example, the feature models can include MIMO models (e.g., spatial MIMO models). Each individual feature model targets a particular feature. For example, the feature models shown in the system 300 include a thickness feature model 322, a resistivity feature model 324 and a stress feature model 326. In some examples, a smaller subset of the inputs, or "set of relevant inputs," can be identified as the primary factors impacting the on-wafer characteristics, with other operations/parameters being pre or post processing operations preparing for specific actions. Thus, the feature models can be created for each feature based on the set of relevant inputs. Inputs of a feature model 320 may include manufacturing parameters (e.g., process parameters, hardware parameters). Output of a feature model may be metrology data or performance data. For example, inputs of a feature model may be temperature, pressure, and flow rate, and the output of the feature model may be thickness. Each feature model 320 may output a corresponding feature (e.g., type of metrology data, type of performance data, etc.). As will be described in further detail herein, the use of individualized feature models for respective features can enable greater control over achieving the desired characteristics.

In some implementations, a design of experiment (DoE) technique is used to generate the set of feature models 320. DoE techniques can be used to detect wafer sensitivity in view of changing recipe parameters. DoE is the design of any information-gathering exercise where variation is present. DoE analysis is the analysis of data generated from execution of a DoE (i.e., DoE data). In some implementations, DOE data includes recipe parameters, recipe parameter values, and measurements (e.g., wafer measurements). For example, for a DoE analysis in which five recipe parameters may be varied, a DoE can be performed by running multiple experiments where each of the five recipe parameters is varied according to predetermined values for each experiment. Wafers from each experiment may then be measured at various locations and associated with their corresponding recipe parameters. Sensitivity values may be calculated by comparing the variation in recipe parameters to the variation in measurements from each measured location, from each of the experiments. Sensitivity values are then commonly averaged to determine a wafer's average sensitivity to a particular recipe parameter. Sensitivity may be calculated corresponding to averaged radial sensitivity values across a wafer.

As will be described in further detail below, each feature model of the set of feature models 320 can be used to generate a recipe based on the set of target properties 310 by capturing spatial relationships among their corresponding features. To do this, the set of feature models 320 can be provided to the numerical optimizer component 330. The numerical optimizer component 330 executes numerical search and optimization routines to generate an output in view of the set of feature models 320 and the set of target properties 310. In some implementations, the output of the numerical optimizer component 330 can include, or can be used to generate, at least one pre-populated recipe 340. The pre-populated recipe 340 has recipe settings, including a set of inputs as rows and a set of processes as columns. Each entry in the recipe 340 (e.g., $x_1$ through $x_6$) denotes an entry for an input needed at each process.

In some implementations, the output includes at least one set of recipe parameters. Each set of recipe parameters can be paired with the desired value for each feature (as indicated by the set of target properties 310) and a predicted value for each feature. In some implementations, the predicted value is be a mean value. Each set of recipe parameters can be ordered or ranked in view of how well each set of recipe parameters achieves the set of target properties 310. In this illustrative example, as mentioned above, one target is that the desired thickness mean is 1000 angstroms (Å), such that it would be optimal to find a combination of recipe parameters resulting in a predicted thickness mean as close to 1000 Å as possible in view of the each constraint specified by the feature models. Another target is that the desired resistivity is greater than 2.03, such that it would be optimal to find a combination of recipe parameters resulting in a predicted resistivity greater than 2.03 in view of each constraint specified by the feature models. The number of sets of recipe parameters output by the numerical optimizer component 330 can be a default number and/or can be customized by a user. For example, the output can include the top 10 sets of recipe parameters, the top 25 sets of recipe parameters, a single set of recipe parameters, etc.

Ideally, a set of recipe parameters will simultaneously satisfy each target property of the set of target properties 310. However, it may be the case that the numerical optimizer component 330 cannot generate recipe solutions that simultaneously satisfy each target property of the set of target properties 310. For example, the numerical optimizer component 330 may find sets of recipe parameters that are predicted to satisfy targets for at least one feature (at least one satisfied feature), but at the expense of the target of at least one other feature (at least one non-satisfied feature). In such cases, the output generated by the numerical optimizer component 330 can be a Pareto frontier or front including at least one set of Pareto efficient recipe parameters. Generally, a Pareto front is a set of Pareto efficient solutions in which no objective can be improved without sacrificing at least one other objective. That is, the Pareto front includes non-dominated solutions. Additionally or alternatively, the output can include solutions that achieve the target for, say, a non-satisfied feature, and an estimated tradeoff with respect to the satisfied feature(s) can be observed. This can be particularly useful in cases where it may be important to ensure that a feature determined to be non-satisfied by the numerical optimizer component 330 can be satisfied by the recipe.

The numerical optimizer component 330 operates by inverting the feature models and performing the search in a high dimensional input and output space. For example, assume that each feature model is a spatial MIMO model of the form $f(\vec{X})=Y$. To invert a feature model, $\vec{X}$ can be solved as follows: $\vec{X}=f-1(\vec{Y})$. In many cases, the function $f(\vec{X})$ may be complex and not readily invertible. To address this, the numerical optimizer component 330 can implement search routines to pseudo-invert $f(\vec{X})$. For example, the numerical optimizer component 330 can search for $\vec{X}$ that minimizes the error between $f(\vec{X})$ and the desired $\vec{Y}$. In addition, the gradient of $f(\vec{X})$ may not be known or difficult to estimate. This means gradient based search routines may not be optimal, and, in some implementations, the numerical optimizer component 330 can implement gradient free searches. Moreover, finding multiple solutions or local minima may be advantageous, as some solutions may be more preferable than others. Examples of search routines that can be used by the numerical optimizer component 330 include swarm based search routines and/or genetic based search routines. Accordingly, the numerical optimizer can search through a continuous space satisfying multiple criteria, as compared to searching through a discrete space and attempting to manually balance multiple desired characteristics. Further details regarding the operations of the numerical optimizer component 330 will be described below with reference to FIGS. 4 and 5.

Figure 4:
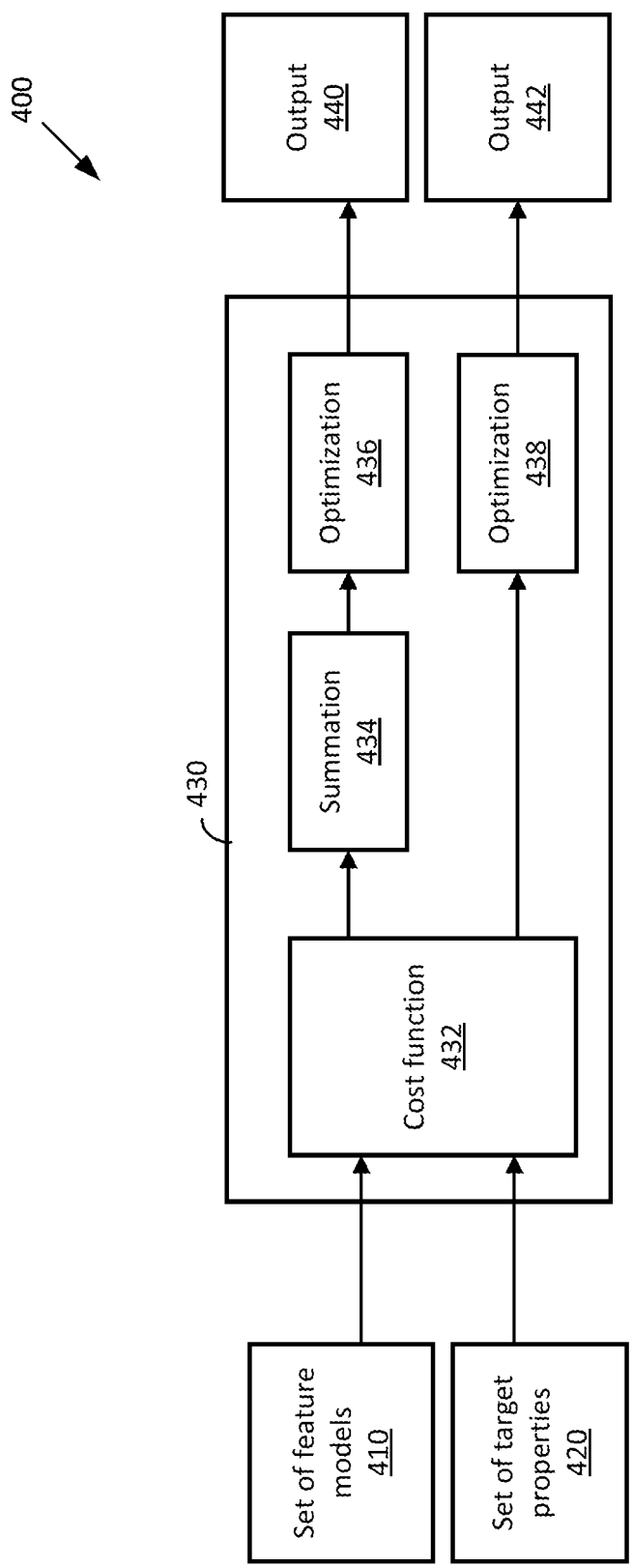
FIG. 4 is a block diagram of a system for performing numerical optimization techniques to create process recipes, according to aspects of the present disclosure.

FIG. 4 is a diagram of a system 400 for performing numerical optimization on a single feature model, according to aspects of the present disclosure. As shown, the system 400 includes a set of feature models 410 including one or more feature models each corresponding to a feature and a set of target properties 420 including one or more targets (e.g., desired characteristics) corresponding to respective ones of the features. Each target is or will be associated with a cost function. The set of feature models 410 and the set of target properties 420 are received by a numerical optimizer 430 to generate an output 440, such as that described above with reference to FIG. 3.

As shown, the numerical optimizer 430 includes a cost function component 432. The cost function component 432 creates a cost function for each feature model and target property, and selects an optimization algorithm to minimize cost with respect to the feature model and the target property. Examples of cost functions of cost function component 432 include mean, min sigma, min range, etc.

For example, cost, C, can be defined by the equation $C=D\times(\Delta+\partial\times err)$, where D is the desirability of the feature (only applicable if there are multiple features), $\Delta$ is a function of the feature model that captures the difference between what is desired and what the feature model predicts for the inputs, err is the estimated error or confidence in the prediction, and $\partial$ is an error penalty. The error penalty helps force the optimization to favor solutions with high confidence over low confidence in the event that more than one solution exists.

Customized cost functions can be created to improve the optimization process. For example, a mean cost function to calculate a mean cost, $C_{mean}$, can be defined by $C_{mean}=D\times(rMSE(f(\vec{X})-\vec{Y}_{target})+\partial\times err)$ where rMSE is root mean square error and $\vec{Y}_{target}$ is a target output for $f(\vec{X})$, a minimum sigma cost function to calculate min sigma cost, $C_{sigma}$, can be defined as $C_{sigma}=D\times(\Sigma(\vec{f}(\vec{X}))+\partial\times err)$, where sigma refers to standard deviation, and a less than cost function to calculate a less than cost, C<, can be defined by:

$$C_< = D \times (m + n + \partial \times err)$$

$$(m=0 \rightarrow f(\vec{X})_{mean} < \vec{Y}_{target}) \wedge (m = f(\vec{X})_{mean})$$

$$(n = f(\vec{X})_{sigma} \rightarrow f(\vec{X})_{mean} < \vec{Y}_{target}) \wedge (n=0)$$

That is, m=0 and n=$f(\vec{X})_{sigma}$ if $f(\vec{X})_{mean}<\vec{Y}_{target}$, otherwise m=$f(\vec{X})_{mean}$) and n=0. Alternatively, $f(\vec{X})_{mean}$ can be replaced with, e.g., $f(\vec{X})_{max}$. By doing so, all output targets are forced to be less than the maximum output of $f(\vec{X})$. The m term controls the mean across the wafer and the n term controls the sigma (i.e., variability) across the wafer.

If we know the solution for all desired targets is potentially present in the solution space, the cost function outputs can be merged by summing the outputs of each individual cost function at a summation component 434. This new cost function can then minimized using an optimization component 436 to implement one or more optimization routines. Examples of methods that can be used to minimize the new cost function include particle swarm, Nelder-Mead, genetic search, etc.

However, if we know that we cannot simultaneously achieve each target property of the set of target properties 420, the cost functions can remain as individual cost functions and a family of genetic search algorithms can be used by an optimization component 438. For example, the family of genetic search algorithms can be Multiobjective Evolutionary Algorithms (MoEA) that generate an output 442. The output can include a Pareto front for the set of target properties 420.

Illustratively, the set of feature models 410 can include regression models. Linear regression can be used to find values from the experiment data, β values, that minimizes the error between a predicted output and an actual output. Each regression model can be created at a measurement location (e.g., for 49-point metrology, there will be 49 regression models). The β values can be viewed as sensitivity parameters that specify the sensitivity at each measurement location. To find recipe conditions for on-wafer targets, optimization routines can be used to find the recipe inputs (e.g., temperature, power) that minimize the error between the output of the expected performance and the output of the observed performance. Optimization can then be performed on based on the regression models to find recipe conditions for on-wafer targets by (1) employing the cost function(s) to define the difference between the predicted value for any input and the desired value and (2) using the optimization routine(s) to find the input conditions that minimize the cost function(s), hence finding the recipe settings to find the desired on-wafer targets.

Referring back to FIG. 2, the system 200 can further include a recipe matching component 250. The matching component 250 receives a recipe model from the recipe creation component 240, and process feedback from the tool/chamber 220, and generates a set of recipe offsets ("offset") 252 by performing matching. For example, the process feedback can include a current or predicted performance behavior of the processing performed by the tool/chamber 220. In this illustrative example, the current or predicted performance behavior is current or predicted wafer performance behavior. Matching can be performed to generate the offset 252 by searching for offsets from the inputs defined in the recipe 242 that will make the current or predicted performance behavior match a desired or expected performance behavior corresponding to the recipe 242. That is, the offset 252 corrects for any change or drift in performance behavior (e.g., on-wafer performance) resulting from mismatch between the current or predicted performance behavior and the expected or desired performance behavior. In alternative implementations, the offset 252 can be a new set of recipe settings for generating a recipe (e.g. using the recipe creation component 240).

In some implementations, the current or predicted performance can be measured by any suitable metrology technique. Examples of metrology techniques include on-board metrology, inline metrology and virtual metrology.

On-board metrology can refer to measurements performed on the devices themselves within a die or on test structures having features similar to the devices. Depending on the measurement techniques used, the test structures may include, but are not limited to, structures similar to logic or memory devices that are on the wafers. On-board metrology can be based on optical measurements (e.g., collecting optical emission spectra in-situ from devices or test structures, or macro 2D mapping using optical targets) or other types of measurements. These optical or other measurements can be inside the chamber (in-situ), or outside the chamber (ex-situ), but still under vacuum, or, at the factory interface (not necessarily under vacuum) on a process platform that may have multiple chambers.

Inline metrology can refer to measurements that may be performed outside of a processing chamber, but without having to take the wafer out of the production line. An example of in-line metrology is scanning electron microscope (SEM), the advanced versions of which may offer high precision and broad modality. Advanced SEMs may include back-scattered electron (BSE) sensors in addition to secondary emission detectors, and ability to measure electron emission at various tilt angles and various landing energy, ranging from hundreds of electron-volt to tens of kilo electron-volts. SEMs have the capability of creating a broad database of metrology data in a non-destructive manner. SEM-based in-line metrology customized with electron beam ("e-beam") simulation, data collection, image characterization and feature extraction as well as statistical analysis may be referred to as "customized metrology." An advanced SEM tool may be used as the foundation of high-precision, non-destructive three-dimensional feature level profiling which is at the heart of customized metrology.

Virtual metrology can refer to predicted measurements (e.g., dimensions) of a wafer determined based on sensor data taken by various sensors in the chamber or outside the chamber, without directly measuring the wafer. VM can include time traces of various process variables, such as pressure, temperature, RF power, current, voltage, flow control position etc.

In some implementations, the current or predicted performance can be estimated from a MIMO sensor based model. Further details regarding the MIMO sensor based model will now be described below with reference to FIG. 5.

Figure 5:
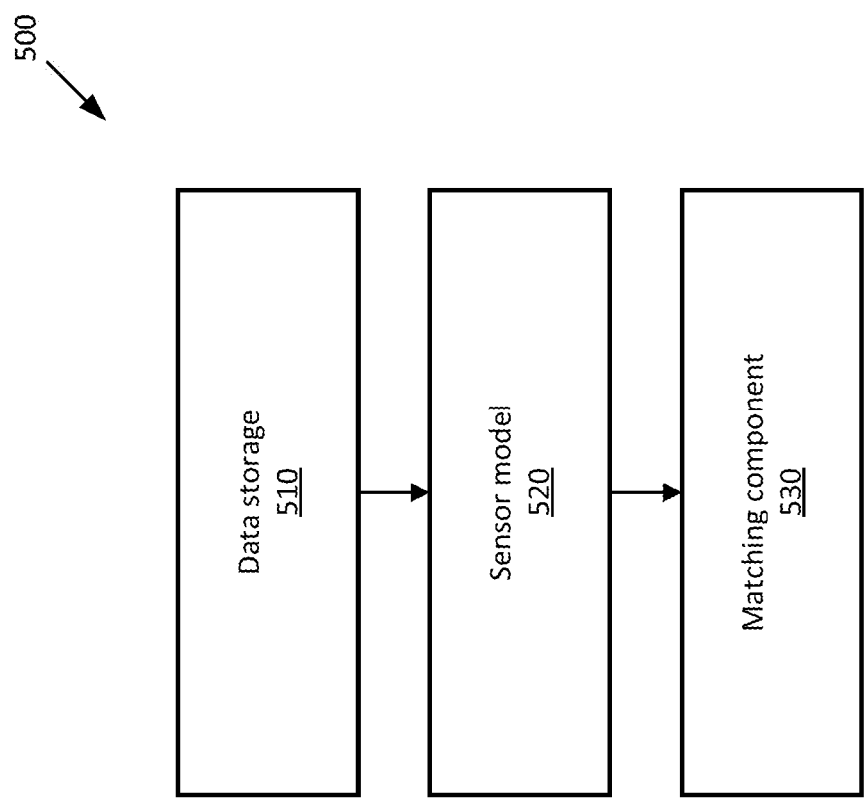
FIG. 5 is a block diagram of a system including a sensor model for implementing process recipe matching using feature models, according to aspects of the present disclosure.

FIG. 5 is a diagram of a system 500 including a sensor model for implementing process recipe creation and matching using feature models (e.g., machine learning feature models), according to aspects of the present disclosure. As shown, the system 500 includes data storage 510. The data storage 510 stores real-time sensor data (e.g., sensor feedback data). The system 500 further includes a sensor model component 520 implementing a sensor model. The sensor model is a MIMO model (e.g., regression model) that uses the sensor data from the data storage 510 to generate predicted performance behavior (e.g., on-wafer performance behavior) for use by the matching component 530, as described above with reference to FIG. 2.

The sensor model is mathematically similar to the feature model, except different inputs are used. For example, a set of recipe settings can be used as input for a feature model, while a set of sensor feedback data obtained from a tool/chamber can be used as input for the sensor model. Examples of data that can be included in the set of sensor feedback data include pressure reading, valve positions, heater power, etc. That is, the sensor model can be viewed as an implementation of virtual metrology. The sensor model can be used to indicate current behavior, and the recipe model can be used to indicate expected behavior. The matching component 530 computes the offsets between the current behavior (e.g., indicated by the sensor model) and the expected behavior to compute the offsets.

Figure 6:
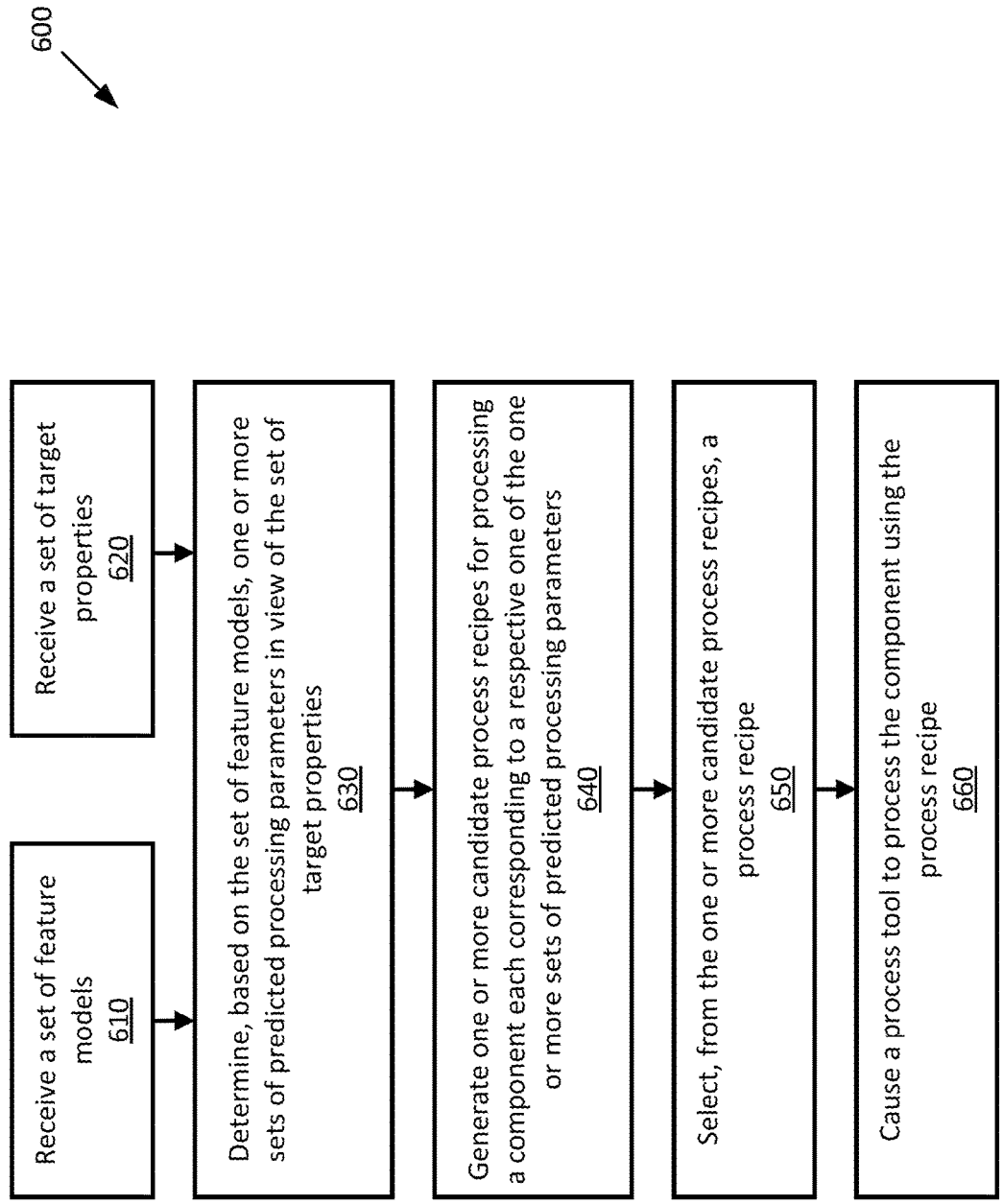
FIG. 6 is a flow chart of a method for implementing process recipe creation using feature models, according to aspects of the present disclosure.

FIG. 6 is a flow chart of a method 600 for implementing process recipe creation using feature models (e.g., machine learning feature models), according to aspects of the present disclosure. Method 600 is performed by processing logic that can include hardware (circuitry, dedicated logic, etc.), software (such as is run on a general purpose computer system or a dedicated machine), firmware, or some combination thereof. In one implementation, method 600 can be performed by a computer system, such as computer system architecture 100 of FIG. 1. In other or similar implementations, one or more operations of method 600 can be performed by one or more other machines not depicted in the figures.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 610, the processing logic receives a set of feature models. For example, the set of feature models can include a machine learning feature model (e.g., the machine learning model 190 of FIG. 1) The set of feature models includes a number of feature models each corresponding to a feature associated with processing of a component. Examples of features include thickness, resistivity, stress, etc. For example, the component can be a wafer or substrate. In some implementations, each feature model is a regression model. For example, each feature model can be a MIMO model (e.g., spatial MIMO model). In some embodiments, a feature model may have inputs of manufacturing parameters (e.g., process parameters, hardware parameters), such as temperature, pressure, flow rate, etc. A feature model may have an output (e.g., metrology data, performance data), such as thickness, resistivity, stress, etc. Each feature model may have a different output that corresponds to a particular feature (e.g., type of metrology data, type of performance data). In some embodiments, target metrology data or target performance data can be provided to the feature model (e.g., an inverted feature model) and the predicted manufacturing parameters (e.g., to be used to obtain the target metrology data or the target performance data) is received from the feature model. In some embodiments, manufacturing parameters are provided to the feature model and predicted metrology data or predicted performance data are received from the feature model.

At block 620, the processing logic receives a set of target properties. For example, the set of target properties can include target metrology data or target performance data. The set of target properties can include a number of features and a number of targets corresponding to respective ones of the features. For example, a thickness feature can have a target of "equal to" and a value of "1000 Å," such that the target for the thickness feature is a thickness equal to a mean of 1000 Å. As another example, a resistivity feature can have a target of "greater than" and a value of "2.03," such that the target for the resistivity feature is a resistivity greater than 2.03.

At block 630, the processing logic determines, based on the set of feature models, one or more sets of predicted processing parameters in view of the set of target properties and, at block 640, the processing logic generates one or more candidate process recipes for processing a component each corresponding to a respective one of the one or more sets of predicted processing parameters. In some implementations, the component is a wafer. Each set of predicted processing parameters includes a number of parameters related to operations performed during component processing (e.g., temperature, pressure). Blocks 630 and 640 can be performed as individual operations or as simultaneously operations.

Generating the one or more candidate process recipes can include using numerical optimization to minimize a difference between a target property and a corresponding predicted property. For example, generating the one or more candidate process recipes can include obtaining at least one cost function based on the set of feature models and the set of target properties, and obtaining the set of candidate process recipes by minimizing the at least one cost function. For example, the set of candidate process recipes can include multiple candidate process recipes that are ranked based on how well they satisfy the set of target properties, and the process recipe can be selected by the user as a process recipe having a highest ranking. In some instances, no candidate process recipe exists that meets each of the conditions of the set of target properties. In such cases, a Pareto front of candidate process recipes can be generated and displayed in the GUI, and the process recipe can be selected by the user via the GUI based on characteristic preference. Further details regarding numerical optimization are described above with reference to FIG. 4.

At block 650, the processing logic selects, from the one or more candidate process recipes, a process recipe. Selecting the process recipe can include receiving a selection of the process recipe from a user via a graphical user interface (GUI) that lists the set of candidate process recipes.

At block 660, the processing logic causes a process tool to process the component using the process recipe. Further details regarding blocks 610-640 are described above with reference to FIGS. 2-4.

Figure 7:
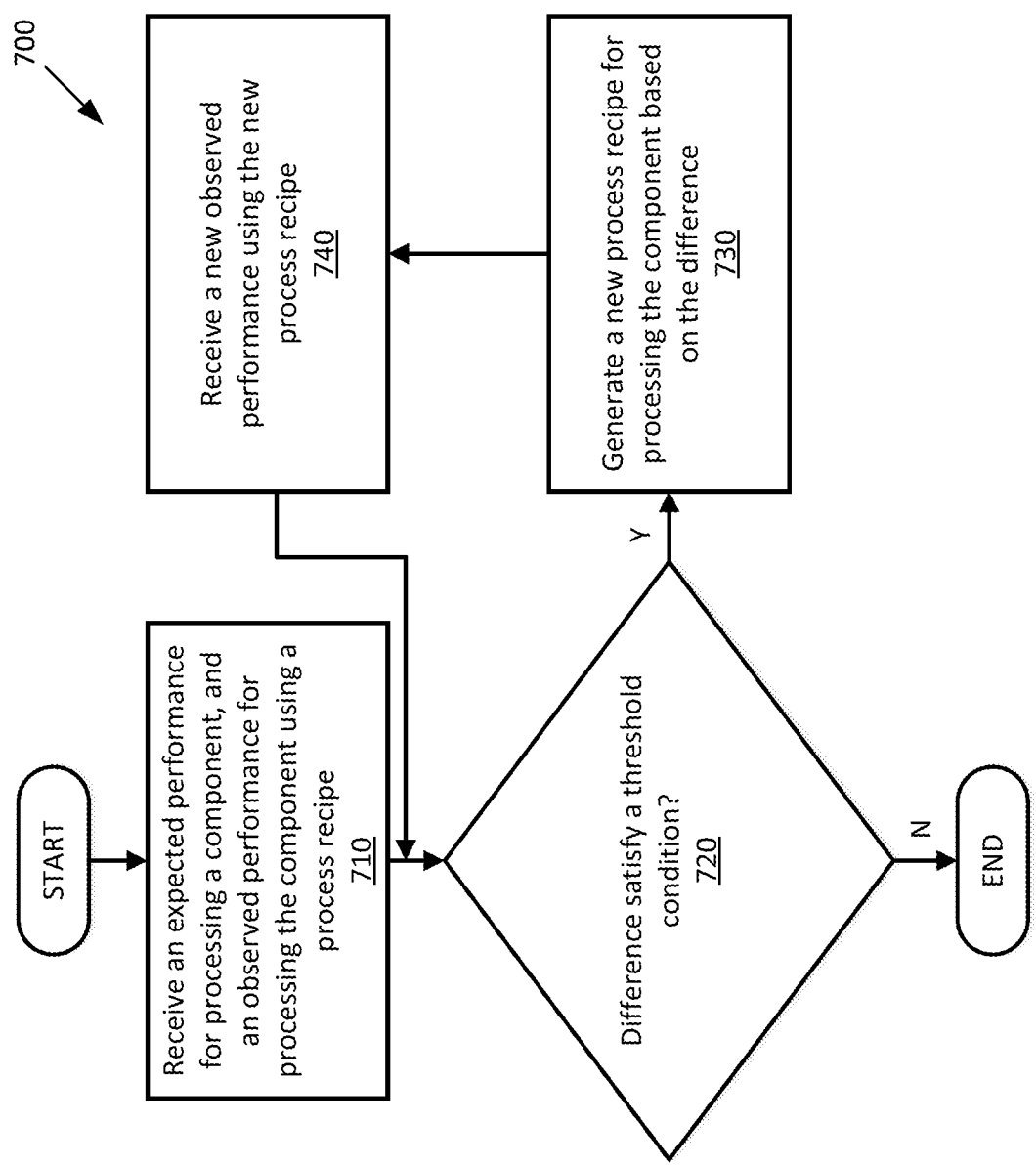
FIG. 7 is a flow chart of a method for implementing process recipe matching to generate an offset using feature models, according to aspects of the present disclosure.

FIG. 7 is a flow chart of a method 700 for implementing process recipe matching to generate an offset using feature models (e.g., machine learning feature models). Method 700 is performed by processing logic that can include hardware (circuitry, dedicated logic, etc.), software (such as is run on a general purpose computer system or a dedicated machine), firmware, or some combination thereof. In one implementation, method 700 can be performed by a computer system, such as computer system architecture 100 of FIG. 1. In other or similar implementations, one or more operations of method 700 can be performed by one or more other machines not depicted in the figures.

For simplicity of explanation, the methods are depicted and described as a series of acts. However, acts in accordance with this disclosure can occur in various orders and/or concurrently, and with other acts not presented and described herein. Furthermore, not all illustrated acts can be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 710, the processing logic receives an expected performance for processing a component, and an observed performance for processing the component using a process recipe. The expected performance corresponds to the feature model output(s) (e.g., machine learning feature model output(s)) for a current set of recipe settings. In some implementations, the component is a wafer or substrate. The observed performance can be a current performance of actual processing using the process recipe (e.g., process feedback).

At block 720, the processing logic determines whether a difference between the expected performance and the observed performance satisfies a threshold condition. In some embodiments, it can be determined whether the difference between the expected performance and the observed performance is greater than a threshold difference. For example, the threshold difference can be selected as a difference that is "close enough" to the expected performance so as to not require any modification of the process recipe corresponding to the observed performance. Any suitable technique can be used to determine the difference between the expected performance and the observed performance. In some embodiments, a regression technique can be used.

If the threshold condition is satisfied (e.g., the difference is greater than the threshold difference), then the set of inputs do not need to be modified and the process ends. Otherwise, at block 730, the processing logic generates a new process recipe for processing the component based on the difference. Generating the new process recipe can include generating an output associated with the new process recipe based on the difference, and generating the recipe based on the output. In some implementations, the output includes the new process recipe. In some implementations, the output includes a set of offsets to correct for the difference in performance. For example, the set of offsets can modify the set of inputs used to generate the process recipe previously used to process the component in an attempt to match the expected performance, thereby generating a modified set of inputs for generating the new process recipe.

At block 740, the processing logic obtains a new observed performance using the new process recipe. The process can revert back to block 720 to determine whether a difference between the expected performance and the new observed satisfies the threshold condition.

Figure 8:
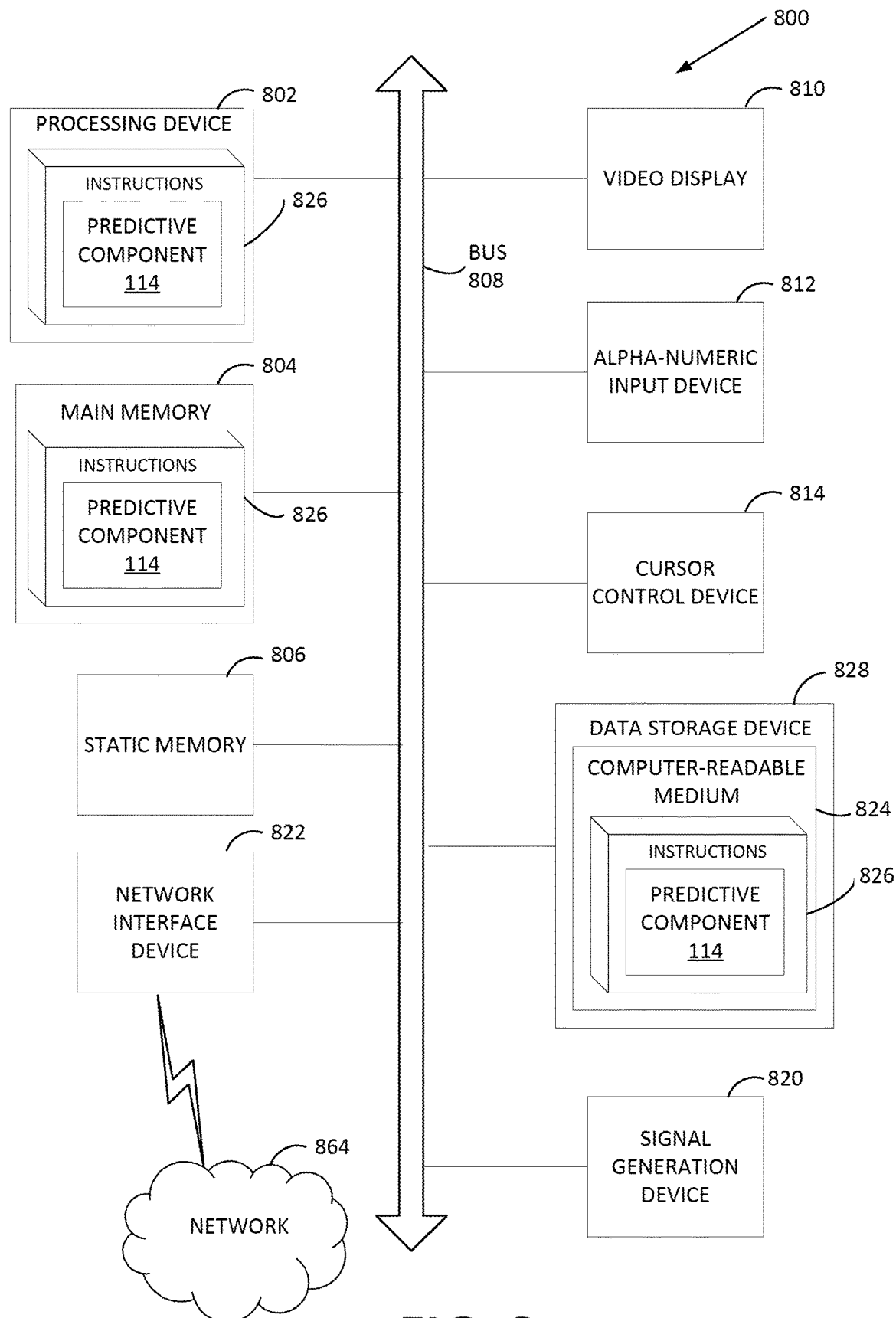
FIG. 8 depicts a block diagram of an illustrative computing device operating in accordance with one or more aspects of the present disclosure.

FIG. 8 depicts a block diagram of an illustrative computing device 800 operating in accordance with one or more aspects of the present disclosure. In alternative embodiments, the machine can be connected (e.g., networked) to other machines in a Local Area Network (LAN), an intranet, an extranet, or the Internet. The machine can operate in the capacity of a server or a client machine in a client-server network environment, or as a peer machine in a peer-to-peer (or distributed) network environment. The machine can be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In embodiments, computing device 800 can correspond to predictive server 112 of FIG. 1 or another processing device of system 100.

The example computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 828), which communicate with each other via a bus 808.

Processing device 802 can represent one or more general-purpose processors such as a microprocessor, central processing unit, or the like. More particularly, the processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. Processing device 802 can also be or include a system on a chip (SoC), programmable logic controller (PLC), or other type of processing device. Processing device 802 is configured to execute the processing logic for performing operations discussed herein.

The computing device 800 can further include a network interface device 822 for communicating with a network 864. The computing device 800 also can include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 828 can include a machine-readable storage medium (or more specifically a non-transitory computer-readable storage medium) 824 on which is stored one or more sets of instructions 826 embodying any one or more of the methodologies or functions described herein. Wherein a non-transitory storage medium refers to a storage medium other than a carrier wave. The instructions 826 can also reside, completely or at least partially, within the main memory 804 and/or within the processing device 802 during execution thereof by the computer device 800, the main memory 804 and the processing device 802 also constituting computer-readable storage media.

The computer-readable storage medium 824 can also be used to store model 190 and data used to train model 190. The computer readable storage medium 824 can also store a software library containing methods that call model 190. While the computer-readable storage medium 824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure can be practiced without these specific details. In other instances, well-known components or methods are not described in detail or are presented in simple block diagram format in order to avoid unnecessarily obscuring the present disclosure. Thus, the specific details set forth are merely exemplary. Particular implementations can vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within +10%.

Although the operations of the methods herein are shown and described in a particular order, the order of operations of each method can be altered so that certain operations can be performed in an inverse order so that certain operations can be performed, at least in part, concurrently with other operations. In another embodiment, instructions or sub-operations of distinct operations can be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a processing device, whether a first process recipe comprising a set of Pareto efficient parameters is to be selected from a set of process recipes for processing a component, wherein the set of Pareto efficient parameters fail to satisfy each target property of a set of target properties for processing the component;
   in response to determining that the first process recipe is not to be selected from a set of process recipes for processing the component, selecting, by the processing device from the set of process recipes, a second process recipe comprising a set of parameters satisfying each target property of the set of target properties; and
   causing, by the processing device, the component to be processed by a process tool using the second process recipe.

2. The method of claim 1, further comprising:
   receiving, by the processing device, a set of feature models comprising a set of spatial multiple-input multiple-output (MIMO) models, each feature model of the set of feature models corresponding to a respective feature associated with processing of a component;
   determining, by the processing device using the set of feature models, one or more sets of predicted processing parameters based on the set of target properties; and
   generating, by the processing device, the set of process recipes based on the one or more sets of predicted processing parameters.

3. The method of claim 2, wherein generating the set of process recipes further comprises using numerical optimization to minimize a difference between a target property and a corresponding predicted property.

4. The method of claim 3, wherein generating the set of process recipes further comprises:
   minimizing a cost function obtained based on the set of feature models and the set of target properties.

5. The method of claim 1, wherein each process recipe of the set of process recipes corresponds to a set of predicted properties.

6. The method of claim 5, wherein the set of predicted properties comprises, for each feature associated with processing the component, a respective predicted property value resulting from processing the component.

7. The method of claim 1, further comprising:
   receiving, by the processing device, an expected performance for processing the component using the second process recipe, and an observed performance for processing the component using the second process recipe;
   determining, by the processing device, that a difference between the expected performance and the observed performance does not satisfy a threshold condition; and
   generating, by the processing device, a new process recipe for processing the component based on the difference.

8. A system comprising:
   a memory and
   a processing device, operatively coupled to the memory, to perform operations comprising:
      determining whether a first process recipe comprising a set of Pareto efficient parameters is to be selected from a set of process recipes for processing a component, wherein the set of Pareto efficient parameters fail to satisfy each target property of a set of target properties for processing the component;
      in response to determining that the first process recipe is not to be selected from a set of process recipes for processing the component, selecting, from the set of process recipes, a second process recipe comprising a set of parameters satisfying each target property of the set of target properties; and
      causing the component to be processed by a process tool using the second process recipe.

9. The system of claim 8, wherein the operations further comprise:
- receiving a set of feature models comprising a set of spatial multiple-input multiple-output (MIMO) models, each feature model of the set of feature models corresponding to a respective feature associated with processing of a component;
- determining, using the set of feature models, one or more sets of predicted processing parameters based on the set of target properties; and
- generating the set of process recipes based on the one or more sets of predicted processing parameters.

10. The system of claim 9, wherein generating the set of process recipes further comprises using numerical optimization to minimize a difference between a target property and a corresponding predicted property.

11. The system of claim 10, wherein generating the set of process recipes further comprises:
- minimizing a cost function obtained based on the set of feature models and the set of target properties.

12. The system of claim 8, wherein each process recipe of the set of process recipes corresponds to a set of predicted properties.

13. The system of claim 12, wherein the set of predicted properties comprises, for each feature associated with processing the component, a respective predicted property value resulting from processing the component.

14. The system of claim 8, wherein the operations further comprise:
- receiving an expected performance for processing the component using the second process recipe, and an observed performance for processing the component using the second process recipe;
- determining a difference between the expected performance and the observed performance does not satisfy a threshold condition; and
- generating a new process recipe for processing the component based on the difference.

15. A non-transitory machine-readable storage medium storing instructions which, when executed by a processing device, cause the processing device to perform operations comprising:
- determining whether a first process recipe comprising a set of Pareto efficient parameters is to be selected from a set of process recipes for processing a component, wherein the set of Pareto efficient parameters fail to satisfy each target property of a set of target properties for processing the component;
- in response to determining that the first process recipe is not to be selected from a set of process recipes for processing the component, selecting, from the set of process recipes, a second process recipe comprising a set of parameters satisfying each target property of the set of target properties; and
- causing the component to be processed by a process tool using the second process recipe.

16. The non-transitory machine-readable storage medium of claim 15, wherein the operations further comprise:
- receiving a set of feature models comprising a set of spatial multiple-input multiple-output (MIMO) models, each feature model of the set of feature models corresponding to a respective feature associated with processing of a component;
- determining, using the set of feature models, one or more sets of predicted processing parameters based on the set of target properties; and
- generating the set of process recipes based on the one or more sets of predicted processing parameters.

17. The non-transitory machine-readable storage medium of claim 16, wherein generating the set of process recipes further comprises using numerical optimization to minimize a difference between a target property and a corresponding predicted property by:
- minimizing a cost function obtained based on the set of feature models and the set of target properties.

18. The non-transitory machine-readable storage medium of claim 15, wherein each process recipe of the set of process recipes corresponds to a set of predicted properties.

19. The non-transitory machine-readable storage medium of claim 18, wherein the set of predicted properties comprises, for each feature associated with processing the component, a respective predicted property value resulting from processing the component.

20. The non-transitory machine-readable storage medium of claim 15, wherein the operations further comprise:
- receiving an expected performance for processing the component using the second process recipe, and an observed performance for processing the component using the second process recipe;
- determining a difference between the expected performance and the observed performance does not satisfy a threshold condition; and
- generating a new process recipe for processing the component based on the difference.

* * * * *